(12) United States Patent
Johns et al.

(10) Patent No.: US 10,519,857 B2
(45) Date of Patent: Dec. 31, 2019

(54) DISK WITH LATTICE FEATURES ADAPTED FOR USE IN GAS TURBINE ENGINES

(71) Applicant: Rolls-Royce Corporation, Indianapolis, IN (US)

(72) Inventors: Charles W. Johns, Brownsburg, IN (US); Emanuel Papandreas, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 406 days.

(21) Appl. No.: 15/332,164

(22) Filed: Oct. 24, 2016

(65) Prior Publication Data
US 2018/0112595 A1    Apr. 26, 2018

(51) Int. Cl.
*F02C 3/16* (2006.01)

(52) U.S. Cl.
CPC ............ *F02C 3/16* (2013.01); *F05D 2230/60* (2013.01); *F05D 2240/35* (2013.01); *Y02T 50/671* (2013.01)

(58) Field of Classification Search
CPC .......... F02C 3/16; F02C 3/02; F05D 2230/60; F05D 2240/35; F23R 3/56; F23R 7/00; F23C 15/00; F04F 13/00
USPC ........................... 60/39.34, 39.35, 39.44, 805
See application file for complete search history.

(56) References Cited

U.S. PATENT DOCUMENTS

| | | | |
|---|---|---|---|
| 369,469 A * | 9/1887 | Perrot ................ | F04D 15/0016 60/39.44 |
| 1,864,742 A * | 6/1932 | Koch ................. | F02C 7/16 60/39.35 |
| 2,591,549 A * | 4/1952 | Jonker ................ | F02C 3/16 415/79 |
| 2,836,958 A * | 6/1958 | Ward, III ............ | F23R 3/56 60/268 |
| 3,234,736 A * | 2/1966 | Spalding ............ | F02C 3/02 60/39.45 |
| 3,522,703 A * | 8/1970 | Ferenc ............... | F02C 5/02 60/39.44 |
| 6,022,190 A | 2/2000 | Schillinger | |
| 6,526,936 B2 * | 3/2003 | Nalim ................ | F02C 3/02 123/213 |
| 7,621,118 B2 * | 11/2009 | Snyder ............... | F23C 15/00 60/247 |
| 2008/0196247 A1 | 8/2008 | Ravi et al. | |
| 2010/0290922 A1 | 11/2010 | Hashimoto et al. | |
| 2012/0036864 A1 | 2/2012 | Riazantsev et al. | |
| 2012/0038206 A1 * | 2/2012 | Chadwick ........... | B60C 7/18 301/37.23 |
| 2012/0038207 A1 * | 2/2012 | Williams ............ | B60C 7/18 301/37.23 |
| 2012/0282109 A1 | 11/2012 | Stiehler | |
| 2014/0086727 A1 | 3/2014 | Xu | |

OTHER PUBLICATIONS

Vagani et al "A Wave Disc Engine Concept for Micro Power Generation" PowerMEMS 2009, Washington DC, USA, Dec. 1-4, 2009, ,pp. 530-533.*
NEFF 1977-97 "Funding of Swiss Energy Research", 1997, p. 148.*

* cited by examiner

*Primary Examiner* — Ted Kim
(74) *Attorney, Agent, or Firm* — Barnes & Thornburg LLP

(57) ABSTRACT

An assembly for a gas turbine engine is arranged to rotate about a central axis of the gas turbine engine. The assembly includes a disk formed to include a plurality of apertures. The disk is operable to transfer rotational energy.

12 Claims, 4 Drawing Sheets

DISK WITH LATTICE FEATURES ADAPTED FOR USE IN GAS TURBINE ENGINES

STATEMENT REGARDING FEDERALLY SPONSORED RESEARCH OR DEVELOPMENT

Embodiments of the present disclosure were made with government support under Contract No. NAS3-98003 Task Order 3. The government may have certain rights.

FIELD OF THE DISCLOSURE

The present disclosure relates generally to gas turbine engines, and more specifically to rotatable disks used in gas turbine engines as part of bladed rotors, wave rotors, and various other rotating assemblies.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are discharged from the turbine and may provide thrust in some applications.

In some gas turbine engines, the compressor and turbine include alternating stages of static vane assemblies and rotating wheel assemblies. The rotating wheel assemblies include disks carrying blades around their outer edges. The disks may experience thermal stresses caused by thermal gradients between the outer edges and inner hubs of the disks.

In some gas turbine engines, the combustor comprises a wave rotor (sometimes called a dynamic pressure exchanger). Typical wave rotors may be configured for constant volume combustion. Some such wave rotors can include an inlet plate, an outlet plate spaced apart from the inlet plate along a central axis of the wave rotor, and a rotor assembly positioned between the plates. The inlet plate provides an inlet port through which a flow of air and fuel pass into rotor passages formed in the rotor assembly. The rotor assembly receives and combusts the fuel-air mixture to produce hot high-pressure products as the rotor assembly rotates about the central axis. The outlet plate provides an outlet port for the hot high-pressure products to exit the wave rotor. The rotor assembly may experience thermal stresses caused by temperature gradients between an outer rim and an inner hub of the rotor assembly.

SUMMARY

The present disclosure may comprise one or more of the following features and combinations thereof.

A wave rotor may include a rotor assembly, a shaft, and a disk. The rotor assembly may be mounted for rotation about a central axis of the wave rotor. The rotor assembly may include an inner band, an outer band, and a plurality of webs. The inner band may be arranged around the central axis. The outer band may be arranged radially outward and co-axially along the inner band. The plurality of webs may be arranged to extend radially between the inner and outer bands to form a plurality of axially-extending combustion cells arranged circumferentially adjacent one another. The shaft may extend along the central axis and may be adapted to receive rotational energy to cause the shaft to rotate about the central axis. The disk may be coupled to the rotor assembly and the shaft. The disk may be configured to transmit the rotational energy from the shaft to the rotor assembly to cause the rotor assembly to rotate about the central axis.

The disk may be formed to include a plurality of lattice apertures that extend axially through the disk. Each lattice aperture may extend circumferentially partway around the central axis so that the plurality of lattice apertures cooperate to form in the disk a plurality of concentric rings and a plurality of radially extending spokes circumferentially offset from one another that extend between the plurality of rings to provide a tortuous path for heat to travel between the rotor assembly and the shaft while allowing thermal growth of the disk.

In some embodiments, each lattice aperture may extend through about 30 degrees to about 120 degrees circumferentially about the central axis. In some embodiments, the plurality of spokes may include a first set of spokes that are circumferentially spaced apart from one another about the central axis and a second set of spokes located radially outward of the first set of spokes. The second set of spokes may be circumferentially spaced apart from one another about the central axis. The second set of spokes may be offset circumferentially relative to the first set of spokes by about 60 degrees.

In some embodiments, the plurality of rings may include an inner ring coupled to the shaft and an outer ring arranged circumferentially about the inner ring and coupled to the rotor assembly. In some embodiments, the plurality of spokes may extend between and interconnects the inner ring and the outer ring.

In some embodiments, the plurality of rings may further include a first intermediate ring and a second intermediate ring. The first intermediate ring may be located radially between the inner ring and the outer ring. The second intermediate ring may be located radially between the outer ring and the first intermediate ring. The plurality of spokes may interconnect the outer ring, the second intermediate ring, the first intermediate ring, and the inner ring.

In some embodiments, the plurality of spokes may include at least three outer spokes, at least three intermediate spokes, and at least three inner spokes. The at least three outer spokes may interconnect the outer ring with the second intermediate ring. The at least three intermediate spokes may interconnect the second intermediate ring and the first intermediate ring. The at least three inner spokes may interconnect the first intermediate ring and the inner ring. In some embodiments, at least one of the rings may include a radially inwardly opening arc portion and a radially outwardly opening arc portion.

In some embodiments, the wave rotor may further include an inlet end plate and an outlet end plate spaced apart axially from the inlet end plate to locate the rotor assembly therebetween. The inlet end plate may be formed to include an inlet port. The outlet end plate may be formed to include an outlet port.

According to another aspect of the present disclosure, a gas turbine engine assembly may include a rotor assembly and a disk. The rotor assembly may be mounted for rotation about a central axis of the gas turbine engine assembly. The rotor assembly may include an annular band arranged around the central axis and a plurality of radially outwardly extending members coupled to the annular band and spaced apart circumferentially relative to one another about the central axis. The disk may be arranged to transmit rotational energy to the rotor assembly to cause the rotor assembly to rotate about the central axis. The disk may include a plurality of concentric spacer rings arranged around the central axis and a plurality of radially extending spokes positioned radially between and interconnecting neighboring spacer rings. An outer most spacer ring of the plurality of spacer rings may be coupled to the annular band of the rotor assembly.

In some embodiments, the plurality of concentric spacer rings may include a first spacer ring and a second spacer ring arranged circumferentially around the first spacer ring. The plurality of radially extending spokes may include a first set of spokes positioned radially between and interconnecting the first spacer ring and the second spacer ring. Each of the spokes included in the first set of spokes may be circumferentially spaced apart equally from one another.

In some embodiments, the plurality of concentric spacer rings may further include a third spacer ring arranged circumferentially around the second spacer ring. The plurality of radially extending spokes may further include a second set of spokes positioned radially between and interconnecting the second spacer ring and the third spacer ring. Each of the spokes included in the second set of spokes may be circumferentially spaced apart equally from one another. The second set of spokes may be circumferentially offset relative to the first set of spokes. In some embodiments, the second set of spokes may be circumferentially offset relative to the first set of spokes by about 60 degrees.

In some embodiments, each of the radially outwardly extending members may include an airfoil and a root. Each root may extend radially into the annular band to couple the corresponding radially outwardly extending member to the annular band.

In some embodiments, the rotor assembly may further include an outer band arranged circumferentially around the plurality of radially outwardly extending members. The outer band may be coupled to at least one of the radially outwardly extending members for movement therewith.

In some embodiments, at least one spacer ring may be formed to include a radially inwardly extending depressed portion. One of the plurality of spokes may be coupled to the at least one spacer ring at the depressed portion and may be arranged to extend radially inwardly toward the central axis.

According to another aspect of the present disclosure, a method of making a gas turbine engine assembly may include a number of steps. The method may include coupling a shaft with a lattice disk, the shaft arranged to rotate about a central axis of the gas turbine engine assembly, the lattice disk formed to define a plurality of lattice apertures that extend axially through the lattice disk, each lattice aperture extends circumferentially partway around the central axis and arranged so that the plurality of lattice apertures cooperate with one another to form in the disk a plurality of concentric spacer rings and a plurality of radially extending spokes that extend between and interconnect the concentric spacer rings, and coupling the lattice disk with a rotor assembly mounted for rotation about the central axis, the rotor assembly including an inner band arranged around the central axis and a plurality of radially outwardly extending members arranged to extend radially outwardly away from the inner band.

In some embodiments, the plurality of radially extending spokes may include a first set of spokes that are circumferentially spaced apart from one another about the central axis and a second set of spokes located radially outward of the first set of spokes. The second set of spokes may be circumferentially spaced apart from one another about the central axis. The second set of spokes may be offset circumferentially relative to the first set of spokes by about 60 degrees.

In some embodiments, the rotor assembly may further include an outer band arranged circumferentially around the inner band. The plurality of radially outwardly extending members may be arranged to extend radially between and interconnect the inner band and the outer band to form a plurality of axially-extending combustion cells arranged circumferentially adjacent one another.

In some embodiments, at least one of the concentric spacer rings may be formed to include a radially inwardly extending depressed portion. One of the plurality of spokes may be coupled to the at least one concentric spacer ring at the depressed portion and arranged to extend radially inwardly toward the central axis.

These and other features of the present disclosure will become more apparent from the following description of the illustrative embodiments.

DETAILED DESCRIPTION OF THE DRAWINGS

Figure 1:
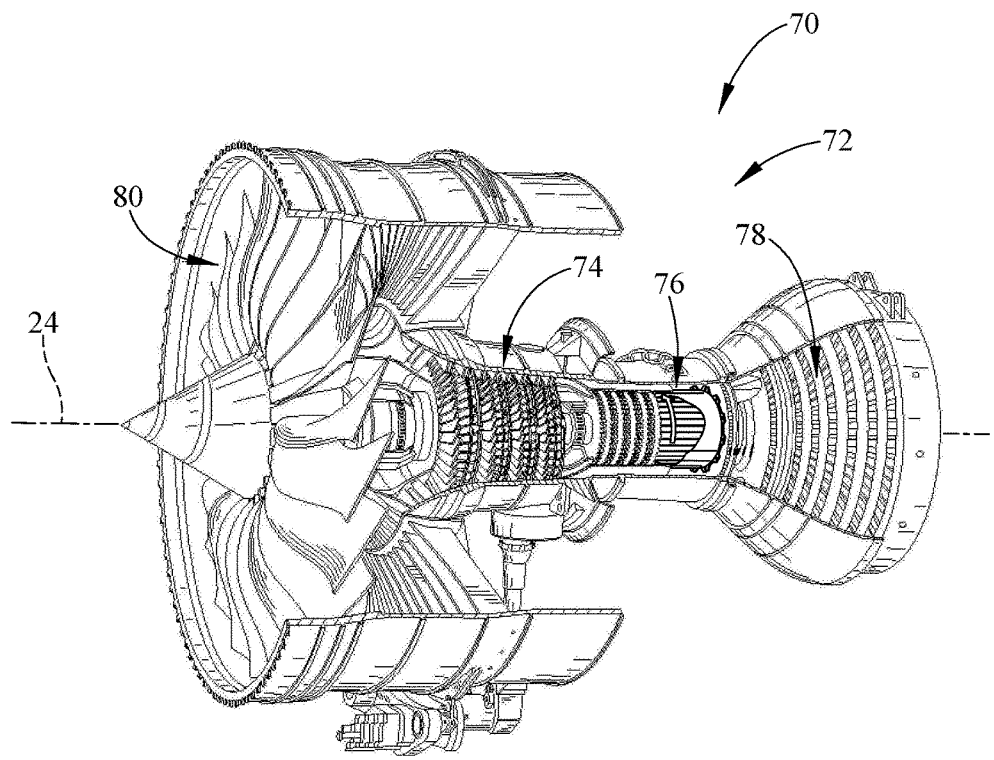
FIG. 1 is a cutaway view of a gas turbine engine in accordance with the present disclosure showing that the gas turbine engine includes a fan, a compressor, a combustor, and a turbine, and showing that the combustor includes a wave rotor arranged to continuously receive and ignite a mixture of fuel and air to produce hot high-pressure products that are directed into the turbine to drive the engine.

For the purposes of promoting an understanding of the principles of the disclosure, reference will now be made to a number of illustrative embodiments illustrated in the drawings and specific language will be used to describe the same.

An illustrative gas turbine engine 70 includes an engine core 72 that powers a fan assembly 80 as shown in FIG. 1. The illustrative engine core 72 includes a compressor 74, a combustor 76, and a turbine 78. In the illustrative embodiment, the combustor 76 comprises a wave rotor 76 (sometimes called a dynamic pressure exchanger). The compressor 74 compresses air drawn into the engine 70 and delivers high-pressure air to the wave rotor 76. The wave rotor 76 is configured to receive and ignite a mixture 224 of the compressed air and fuel in a constant volume combustion process 200. Products of the combustion process 200 in the wave rotor 76 are directed into the turbine 78 where work is extracted to drive the compressor 74, the fan assembly 80 and, sometimes, an output shaft.

Figure 2:
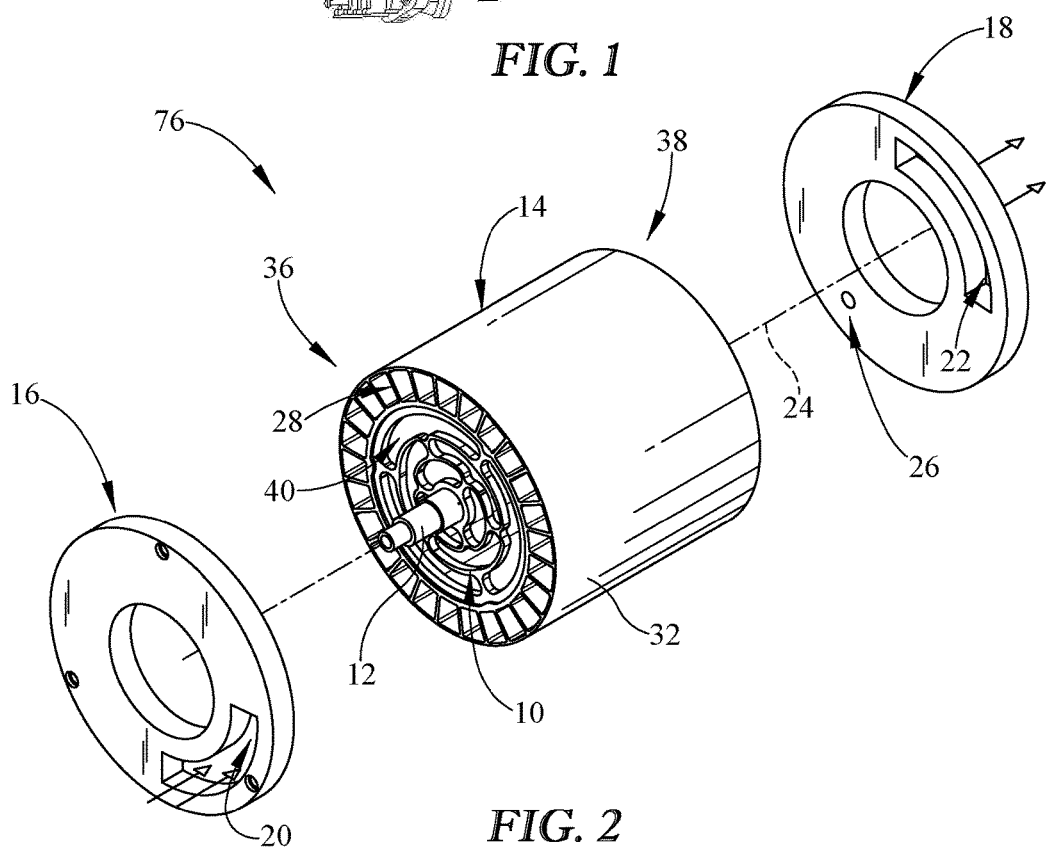
FIG. 2 is an exploded view of the wave rotor included in the gas turbine engine of FIG. 1 showing that the illustrative wave rotor includes, from left to right, an inlet plate, a rotor assembly configured to rotate relative to the inlet plate about a central axis, and an outlet plate.

The wave rotor 76 includes a rotor assembly 14, an inlet plate 16, and an outlet plate 18 as shown in FIG. 2. The rotor assembly 14 is configured to rotate relative to the inlet plate 16 and the outlet plate 18 about a central axis 24 of the wave rotor 76 as suggested in FIG. 2. The rotor assembly 14 is formed to define a plurality of combustion cells 28 configured to receive fueled air 224 (or other premixed reactants) from an inlet port 20 of the inlet plate 16 as the cells 28 align with the inlet port 20. The fueled air 224 is ignited and combusted in the combustion cells 28 and the resulting combustion products are expelled out of the rotor assembly 14 when the combustion cell 28 aligns with an outlet port 22 of the outlet plate 18.

Figure 3:
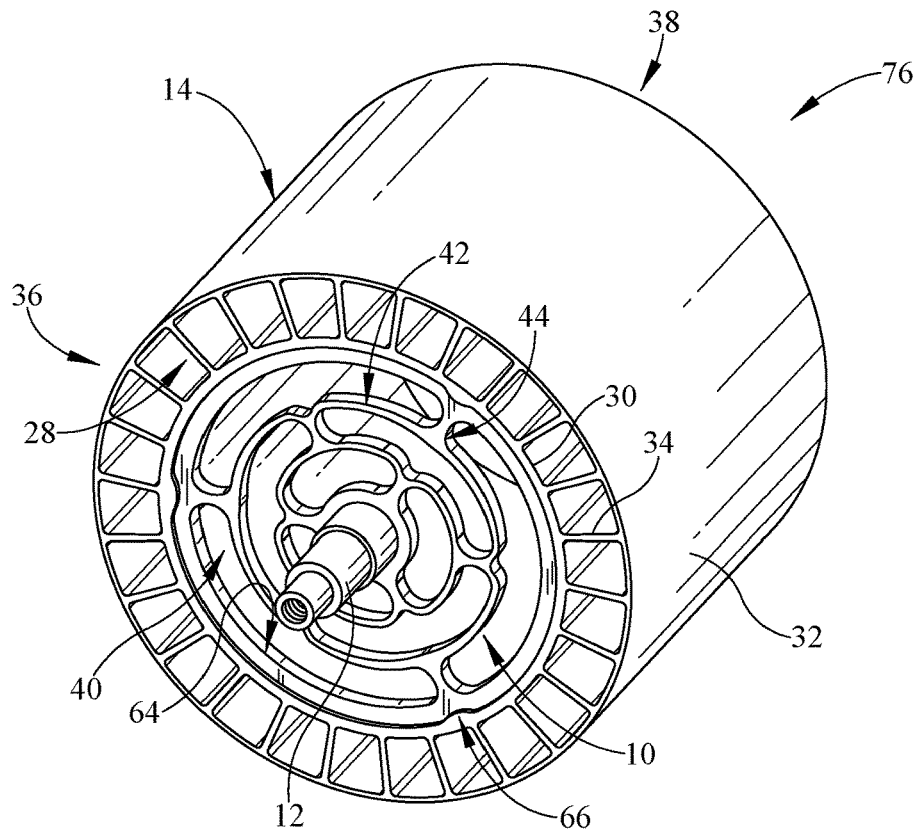
FIG. 3 is a perspective view of the wave rotor of FIG. 2 showing that the wave rotor further includes a central shaft and a lattice disk configured to transmit rotational energy between the central shaft.
Figure 4:
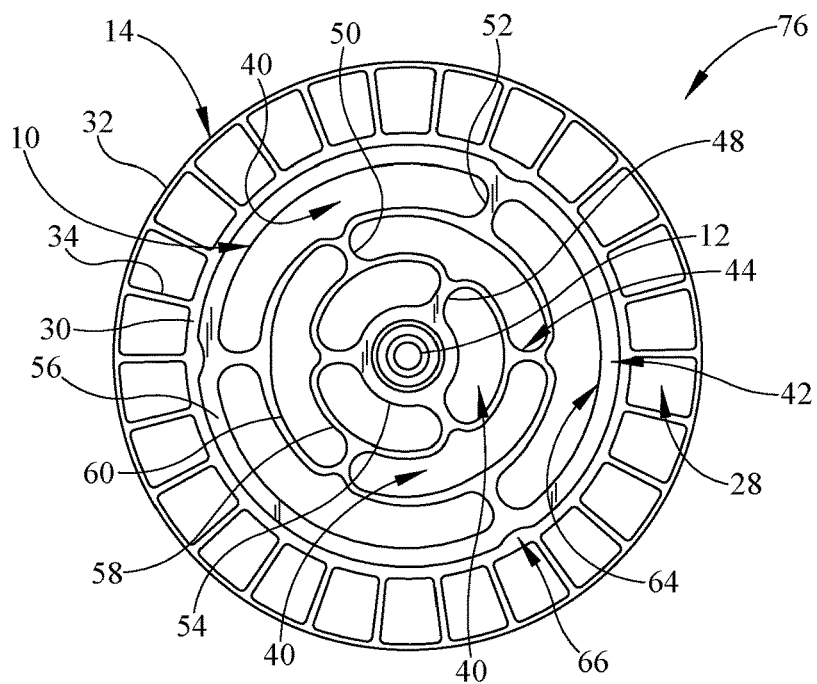
FIG. 4 is an elevation view of the wave rotor of FIG. 3 showing that the lattice disk is formed to include a plurality of lattice apertures that extend partway around the central axis and cooperate with one another to form a plurality of concentric rings and a plurality of spokes that extend between the rings.

The illustrative wave rotor 76 further includes a disk 10 coupled to the rotor assembly 14 and a shaft 12 coupled to the disk 10 as shown in FIGS. 2-4. The disk 10 is adapted to transmit rotational energy from the shaft 12 to the rotor assembly 14 to cause the rotor assembly 14 to rotate about the central axis 24. During operation, the rotor assembly 14 may become hot due to the combustion process 200 that occurs within the rotor assembly 14, while the shaft 12 may be relatively cool. The disk 10 may experience thermal stresses as a result of the thermal gradient between the rotor assembly 14 and the shaft 12. The disk 10 is formed to include a plurality of lattice apertures 40 that extend circumferentially partway around the central axis 24 to define a plurality of radially extending spokes 44 that provide a tortuous path for heat to travel between the rotor assembly 14 and the shaft 12 while allowing thermal growth of the disk 10 to block the formation of thermal stresses as suggested in FIG. 4.

Illustratively, the compressor 74 of the gas turbine engine 70 is located upstream of the wave rotor 76 as shown in FIG. 1. The compressor 74 provides a flow of unfueled air 226 and fuel nozzles continuously spray fuel into a portion of the flow of unfueled air 226 upstream of the inlet port 20 to form the fueled air 224 as suggested in FIG. 6.

The inlet plate 16 is positioned adjacent an inlet end 36 of the rotor assembly 14 to conduct the flow of compressed fueled air 224 into the rotor assembly 14 as suggested in FIG. 2. The illustrative inlet plate 16 is formed to include the inlet port 20 which is arranged to direct a portion of the flow of fueled air 224 into the combustion cells 28 of the rotor assembly 14 as each combustion cell 28 temporarily aligns with the inlet port 20. Illustratively, the inlet port 20 extends axially through the inlet plate 16 along an arc around the central axis 24 as shown in FIG. 2.

The illustrative rotor assembly 14 includes an inner band 30, an outer band 32, and a plurality of webs 34 (sometimes called members 34) as shown in FIGS. 3 and 4. In the illustrative embodiment, the inner and outer bands 32 are annular bands. The outer band 32 is arranged circumferentially around the inner band 30. The webs 34 extend radially outwardly away from the inner band 30 toward the outer band 32 to define the combustion cells 28 and axially aft toward the outlet end 38. As a result, the combustion cells 28 extend axially between the inlet end 36 and an outlet end 38 of the rotor assembly 14 as shown in FIG. 2. The outer band 32 is arranged circumferentially around the plurality of radially outwardly extending webs 34. The outer band 32 is coupled to at least one of the radially outwardly extending webs 34 for movement therewith.

The disk 10 is formed to include the plurality of lattice apertures 40 that extend axially through the disk 10 as shown in FIGS. 3 and 4. Each lattice aperture 40 extends circumferentially partway around the central axis 24 to cause the plurality of lattice apertures 40 to cooperate to form a plurality of concentric rings 42 and a plurality of radially extending spokes 44. In the illustrative embodiment, each lattice aperture 40 extends through about 30 degrees to about 120 degrees circumferentially about the central axis 24 as shown in FIG. 4.

The spokes 44 are circumferentially offset from one another and extend between the plurality of rings 42 to provide a tortuous path for heat to travel between the rotor assembly 14 and the shaft 12 while allowing thermal growth of the disk 10. The lattice work allows the disk 10 to end and flex, but keeps an outer ring of the disk centered relative to the central axis 24. In some embodiments, cooling air is directed through the apertures 40 to cool the disk 10 and rotor assembly 14.

In the illustrative embodiment, the plurality of spokes 44 include a first set of spokes 48, a second set of spokes 50, and a third set of spokes 52 as shown in FIG. 4. In other embodiments, the plurality of spokes 44 may contain any number of spokes 44. In the illustrative embodiment, each of the first set of spokes 48, second set of spokes 50, and third set of spokes 52 include three spokes.

The first set of spokes 48 are circumferentially spaced apart from one another about the central axis. The second set of spokes 50 are located radially outward of the first set of spokes 48. The third set of spokes 52 are located radially outward of the second set of spokes 50. The second set of spokes 50 are circumferentially spaced apart from one another about the central axis 24. Illustratively, the second set of spokes 50 are offset circumferentially relative to the first set of spokes 48 by about 60 degrees. The third set of spokes 52 are circumferentially spaced apart from one another about the central axis 24. Illustratively, the third set of spokes 52 are offset circumferentially relative to the second set of spokes 50 by about 60 degrees.

The plurality of rings 42 (sometimes called spacer rings 42) includes an inner ring 54 coupled to the shaft 12 and an outer ring 56 arranged circumferentially about the inner ring 54 and coupled to the rotor assembly 14 as shown in FIG. 4. In other embodiments, the plurality of rings 42 may contain any number of rings 42. In the illustrative embodiment, the rings 42 are concentric relative to one another as shown in FIG. 4. Illustratively, the plurality of rings 42 further includes a first intermediate ring 58 located radially between the inner ring 54 and the outer ring 56 and a second intermediate ring 60 located radially between the outer ring 56 and the first intermediate ring 58. The outer most ring 56 is coupled to the annular inner band 30 of the rotor assembly 14.

The plurality of spokes 44 extend between and interconnect the outer ring 56, the second intermediate ring 60, the first intermediate ring 58, and the inner ring 54 as shown in FIGS. 3 and 4. In the illustrative embodiment, each of the rings 42 includes a radially inwardly opening arc portion 64 and a radially outwardly opening arc portion 66. The radially outwardly opening arc portion 66 may be formed by a radially inwardly extending depressed portion 66. Illustratively, the spokes 44 are coupled to the rings 42 at the depressed portion 66 and are arranged to extend radially inwardly toward the central axis 24. In some embodiments, each ring is formed from a plurality of arcuate sections. In the illustrative embodiment, each ring is formed from three distinct arcuate sections. A concavity or indentation is formed between each of the arcuate sections to define the depressed portion 66.

The outlet plate 18 is positioned adjacent the rotor assembly 14 to close the outlet end 38 of the rotor assembly 14 to control the flow of combustion products directed out of the rotor assembly 16 as suggested in FIG. 2. The hot-high pressure combustion products are expelled out of the outlet end 38 of the combustion cells 28 through the outlet port 22 of the outlet plate 18 as each combustion cell 28 aligns with the outlet port 22. Illustratively, the outlet port 22 extends axially through the outlet plate 18 along an arc around the central axis 24 as shown in FIG. 2. In some embodiments, the inlet plate is formed to include more than one inlet port and the outlet plate is formed to include more than one outlet port.

The wave rotor 76 illustratively includes an ignition system 26 as shown in FIG. 2. The illustrative ignition system 26 includes a spark ignitor 26 coupled to the outlet plate 18. The spark ignitor 26 is configured to ignite the fueled air 224 in a given combustion cell 28 aligned at a first angular position relative to the central axis 24. In the illustrative embodiment, the spark ignitor 26 is configured to ignite the fueled air in a given combustion cell 28 when that combustion cell 28 is misaligned with the inlet port 20 such that the forward end of the combustion cell 28 is closed by the inlet plate 16. As a result, the combusted products 228 are blocked from flowing upstream into the flow of fueled air 224 by the inlet plate 16. In other embodiments, the ignition system 26 includes a flame ignitor.

A method of assembling and using the gas turbine engine 70 may include coupling the shaft 12 with the lattice disk 10. The shaft 12 may be arranged to rotate about the central axis 24 of the gas turbine engine 70. The lattice disk 10 may be formed to define a plurality of lattice apertures 40 that extend axially through the lattice disk 10. Each lattice aperture 40 extends circumferentially partway around the central axis 24 to cause the plurality of lattice apertures 40 to cooperate with one another to form in the disk 10 a plurality of concentric spacer rings 42 and a plurality of radially extending spokes 44 that extend between and interconnect the spacer rings 42.

The method may further include coupling the lattice disk 10 with the rotor assembly 14 mounted for rotation about the central axis 24. The rotor assembly 14 including the inner band 30 arranged around the central axis 24 and the plurality of radially outwardly extending members 34 arranged to extend radially outwardly away from the inner band 30.

In some embodiments, the combustion cells 28 extend axially along and circumferentially about the central axis 24. In the illustrative embodiment, the rotor assembly 14 is rotated by the shaft 12. In some embodiments, the combustion cells 28 are arranged to cause the rotor assembly 14 to rotate as a result of the shape of the combustion cells 28 and the combustion processes that occurs within the combustion cells 28.

Figure 5:
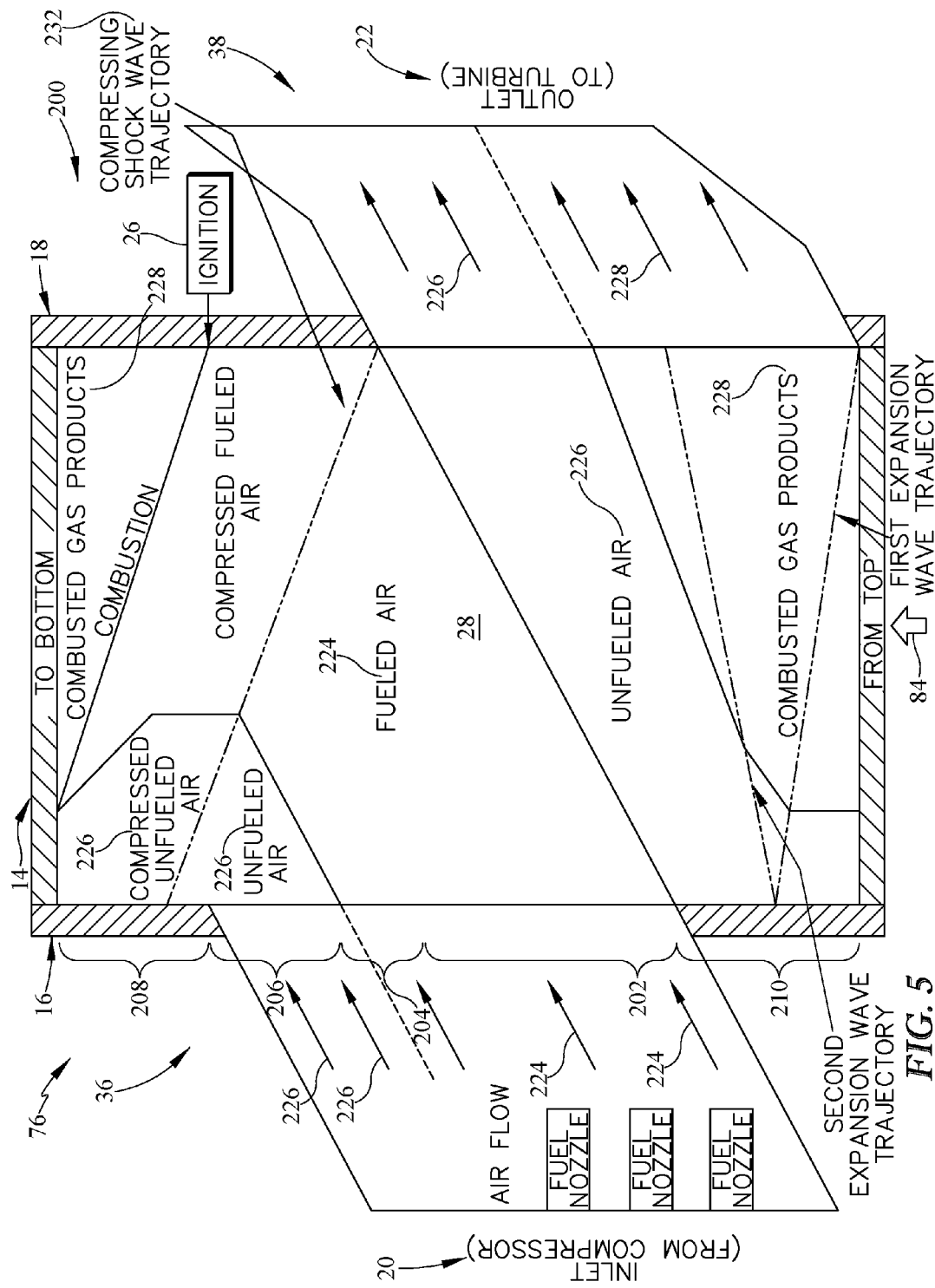
FIG. 5 is a diagrammatic view of a combustion process that occurs within each combustion cell of the wave rotor of FIG. 2 and depicts the cycle of a single combustion cell at continuous circumferential positions as it completes a revolution about the central axis.

The constant volume combustion process 200 that occurs in the wave rotor 76 is depicted in a space-time wave diagram shown in FIG. 5. The illustrative combustion process 200 occurs within each of the combustion cells 28 as the rotor assembly 14 rotates about the central axis 24. The wave diagram depicts a sequence of events occurring during one combustion cycle within the combustion cells 28 in continuous circumferential positions. The arrow 84 indicates the direction of rotation of the combustion cells 28.

The combustion process 200 is periodic such that the top of the wave diagram shown in FIG. 5 loops around and joins with its own bottom. The wave diagram, for the purpose of description, may be started at any point. However, for convenience, the description is started at step 202 toward the bottom of the wave diagram.

In step 202, one of the combustion cells 28 aligns with and opens into the inlet port 20 as shown in FIG. 5. Fueled air 224 is directed through the inlet port 20 into the combustion cell 28. Unfueled air 226 and combusted gas products 228 from a previous cycle are located in the combustion cell 28. The fueled air 224 is drawn into the combustion cell 28 and the unfueled air 226 and combusted gas products 228 flow axially out of the combustion cell 28 through the outlet port 22. Unfueled air 226 from the previous combustion cycle provides a buffer between the fueled air 224 and combusted gas products 228 from the previous cycle. As such, the fueled air 224 is blocked from being ignited unintentionally by the combusted gas products 228 in the combustion cell 28.

In a step 204, the unfueled air 226 is significantly expelled out of the outlet end 38 of the combustion cell 28 and the combustion cell 28 rotates beyond the outlet port 22 as shown in FIG. 5. As a result, the outlet plate 18 blocks fueled air 224 in the combustion cell 28 from escaping through the outlet end 38 of the combustion cell 28. A shock wave 232 initiates at the outlet end 38 of the combustion cell 28 and propagates toward the inlet end 36 to compress the fueled air 224 in response to the outlet plate 18 closing the outlet end 38 of the combustion cell 28 as suggested in FIG. 5.

In a step 206, the combustion cell 28 has rotated and is no longer aligned with the flow of fueled air 224 as shown in FIG. 5. Nonetheless, the flow of unfueled air 226 continues to enter the combustion cell 28 to provide the buffer of unfueled air 226 in the illustrative embodiment.

In a step 208, the combustion cell 28 rotates further about the central axis 24 and is no longer aligned with the inlet port 20 as shown in FIG. 5. As a result, the inlet plate 16 blocks the flow of unfueled air 226 from entering the combustion cell 28. The spark ignitor 26 ignites the compressed fueled air 224 in the combustion cell 28. The fueled air 224 expands to form the combusted gas products 228 and the unfueled air 226 experiences no combustion.

In a step 210, the outlet end 38 of the combustion cell 28 aligns with and opens into the outlet port 22 formed in the outlet plate 18 while the inlet end 36 of the combustion cell 28 is blocked by the inlet plate 16 as shown in FIG. 5. The combusted gas products 228 expand and exit the combustion cell 28 through the relatively low-pressure outlet port 22. The gas products 228 are directed into the turbine 78 to power the engine 70. The combustion cell 28 continues to rotate about the central axis 24 and returns to step 202 as shown in FIG. 5.

Another embodiment of a disk 110 for use in the gas turbine engine 70 is shown in FIG. 5. The disk 110 is substantially similar to the disk 10 shown in FIGS. 1-4 and described herein. Accordingly, similar reference numbers in the 100 series indicate features that are common between the disk 10 and the disk 110. The description of the disk 10 is incorporated by reference to apply to the disk 110, except in instances when it conflicts with the specific description and the drawings of the disk 110.

The disk 110 is adapted for use in a turbine wheel 186 (sometimes called a disk assembly) included in the turbine

78 of the gas turbine engine 70 of FIG. 1. The turbine wheel 186 is formed to include an annular band 130, a plurality of members 134 coupled to the annular band 130, and the disk 110 coupled to the annular band 130 for rotation therewith. The disk assembly 110 is coupled to a shaft 112 arranged to cause the turbine wheel 186 to rotate.

Each of the radially outwardly extending members 134 includes an airfoil 188 and a root 190. Each root 190 extends radially into the annular band 130 to couple the corresponding radially outwardly extending member 134 to the annular band 130. In some embodiments, the radially outwardly extending members 134 may be integrally formed with the turbine wheel in a blisk-type design. For example, the members 134 and the turbine wheel may be monolithically formed.

Figure 6:
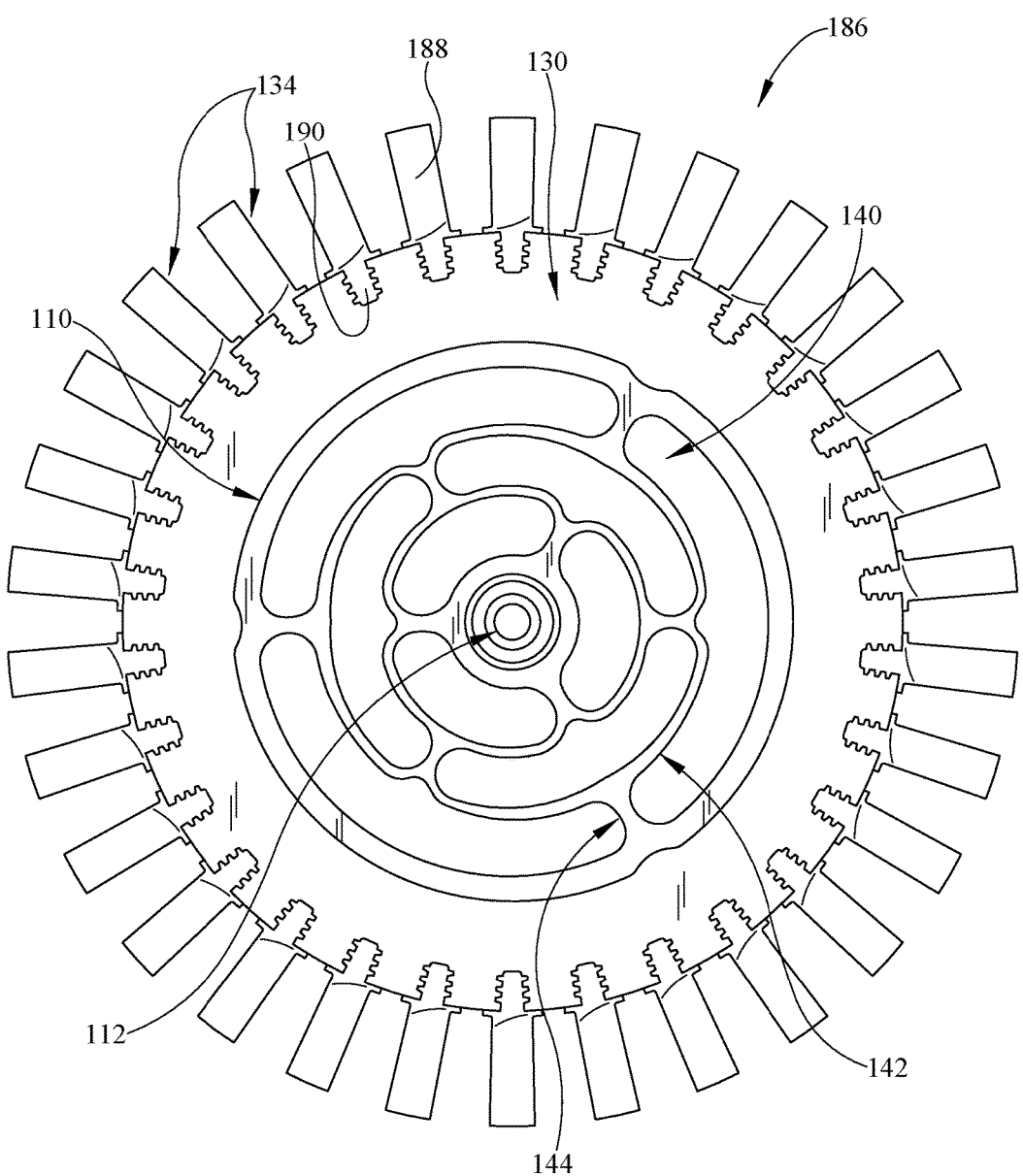
FIG. 6 is an elevation view of a turbine wheel included in the turbine of the gas turbine engine of FIG. 1, the turbine wheel is formed to include an annular band, a plurality of airfoils coupled to the annular band, and a lattice disk coupled to the annular band for rotation therewith.

The disk 110 is formed to include the plurality of lattice apertures 140 that extend axially through the disk 110 as shown in FIG. 6. Each lattice aperture 140 extends circumferentially partway around the central axis 24 to cause the plurality of lattice apertures 140 to cooperate to form a plurality of concentric rings 142 and a plurality of radially extending spokes 144. In the illustrative embodiment, each lattice aperture 140 extends through about 30 degrees to about 120 degrees circumferentially about the central axis 24. The spokes 144 are circumferentially offset from one another and extend between the plurality of rings 142 to provide a tortuous path for heat to travel between the annular band 130 and the shaft 112 while allowing thermal growth of the disk 110. In some embodiments, cooling air is directed through the apertures 140 to cool the disk 110.

It is contemplated that disk 110 may also be incorporated into compressor rotor assemblies or in other rotor assemblies within a gas turbine engine. However, temperatures associated with compressor and other rotor assemblies may not frequently demand lattice features of the present disclosure.

In the illustrative embodiment, the disks 10, 110 are arranged to reduce stress caused by radial thermal gradients. Typically, a disk in a gas turbine engine has a hotter outer diameter than an inner diameter. Such a thermal gradient induces a stress field in the rigid disk. The hotter rim (outer diameter) wants to grow outward radially, but is restrained by the cooler material toward the bore (inner diameter). If the entire disk were at a uniform temperature, no thermal stress would be created. Therefore, much higher rim-to-bore thermal gradients may be handled. A weight of the disk may be reduced because much of the disk weight is typically included to handle stress caused by thermal gradients. Since much of the thermal stress may be reduced, the disk may be designed predominantly for the blade and wheel loads.

Typical wave rotors may include a rotating cylinder that has shock passages (sometimes called combustion channels) in which air is compressed. The radius to the passages from the bore may be about three inches, in some embodiments, and the center shaft may be supported on oil lubricated bearings. Consequently, the gradient from the passages to the hub may be on the order of 1250 degrees Fahrenheit.

The outer ring of the wave rotor may be sufficiently strong to support the shock passages at operating temperatures. However, if a disk attaches the shaft to the outer ring, the thermal gradient may produce stresses that exceed the allowable stress for an acceptable fatigue and/or creep life. Thus, in the present disclosure, a lattice work is used to connect the hot outer ring to the relatively cool shaft.

Illustratively, the lattice work of the disk comprises three rings connected by three sets of spokes that are offset from one another by about 60 degrees. The outer ring may be thermally isolated from the inner shaft. Heat may flow from one ring to another via the spokes, which may limit the amount of heat flux through the disk because of the restricted area of the spokes. The heat path distance from the inner ring to the outer ring may be relatively increased because the heat flows through the ring and spoke lattice work. In other embodiments, the number of rings and spokes may be greater than or less than three. The number of rings and spokes may vary depending on the size of the rotor, the ring and spoke thickness, thermal gradient, and the rotor dynamic environment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wave rotor comprising
a rotor assembly mounted for rotation about a central axis of the wave rotor, the rotor assembly including an inner band arranged around the central axis, an outer band arranged radially outward and co-axially along the inner band, and a plurality of webs arranged to extend radially between the inner and outer bands to form a plurality of axially-extending combustion cells arranged circumferentially adjacent one another,
a shaft extending along the central axis and adapted to receive rotational energy to cause the shaft to rotate about the central axis, and
a disk coupled to the rotor assembly and the shaft and configured to transmit the rotational energy from the shaft to the rotor assembly to cause the rotor assembly to rotate about the central axis, the disk formed to include a plurality of concentric lattice apertures that extend axially through the disk,
wherein each lattice aperture extends circumferentially partway around the central axis and the plurality of lattice apertures are defined by a plurality of concentric rings and a plurality of radially extending spokes arranged perpendicular to the central axis and circumferentially offset from one another that extend between the plurality of rings to provide a tortuous path for heat to travel between the rotor assembly and the shaft while allowing thermal growth of the disk,
wherein the plurality of spokes include a first set of spokes and a second set of spokes located radially outward from the first set of spokes and each of the spokes included in the second set of spokes is circumferentially offset from each of the spokes included in the first set of spokes, and
wherein each lattice aperture is defined circumferentially between directly neighboring spokes.

2. The wave rotor of claim 1, wherein each lattice aperture extends through about 30 degrees to about 120 degrees circumferentially about the central axis.

3. The waver rotor of claim 1, wherein the second set of spokes are offset circumferentially relative to the first set of spokes by about 60 degrees.

4. The wave rotor of claim 1, wherein the plurality of rings includes an inner ring coupled to the shaft and an outer ring arranged circumferentially about the inner ring and coupled to the rotor assembly.

5. The wave rotor of claim 4, wherein the plurality of spokes extends between and interconnects the inner ring and the outer ring.

6. The waver rotor of claim 4, wherein the plurality of rings further includes a first intermediate ring located radially between the inner ring and the outer ring and a second intermediate ring located radially between the outer ring and the first intermediate ring and the plurality of spokes interconnect the outer ring, the second intermediate ring, the first intermediate ring, and the inner ring.

7. The wave rotor of claim 6, wherein the plurality of spokes includes at least three outer spokes that interconnect the outer ring with the second intermediate ring, at least three intermediate spokes that interconnect the second intermediate ring and the first intermediate ring, and at least three inner spokes that interconnect the first intermediate ring and the inner ring.

8. The wave rotor of claim 1, wherein the plurality of rings includes an inner ring coupled to the shaft, an outer ring arranged circumferentially about the inner ring and coupled to the rotor assembly, a first intermediate ring located radially between the inner ring and the outer ring, the first set of spokes interconnects the inner ring and the first intermediate ring and the second set of spokes interconnect the first intermediate ring and the outer ring and all of the spokes interconnecting the inner ring and the first intermediate ring are circumferentially offset from all of the spokes interconnecting the first intermediate ring and the outer ring.

9. The wave rotor of claim 1, wherein the plurality of rings includes an inner ring coupled to the shaft, an outer ring arranged circumferentially about the inner ring and coupled to the rotor assembly, a first intermediate ring located radially between the inner ring and the outer ring, and a second intermediate ring located radially between the outer ring and the first intermediate ring, wherein the first set of spokes interconnect the inner ring and the first intermediate ring, the second set of spokes interconnect the first intermediate ring and the second intermediate ring, and the plurality of spokes further includes a third set of spokes that interconnect the second intermediate ring and the outer ring and each of the spokes included in the third set of spokes is offset circumferentially from each of the spokes included in the second set of spoked and each of the spokes included in the third set of spokes is aligned circumferentially with each of the spokes include in the first set of spokes.

10. A wave rotor comprising
a rotor assembly mounted for rotation about a central axis of the wave rotor, the rotor assembly including an inner band arranged around the central axis, an outer band arranged radially outward and co-axially along the inner band, and a plurality of webs arranged to extend radially between the inner and outer bands to form a plurality of axially-extending combustion cells arranged circumferentially adjacent one another,
a shaft extending along the central axis and adapted to receive rotational energy to cause the shaft to rotate about the central axis, and
a disk coupled to the inner band of the rotor assembly and the shaft and configured to transmit the rotational energy from the shaft to the rotor assembly to cause the rotor assembly to rotate about the central axis, the disk formed to include a plurality of concentric lattice apertures that extend axially through the disk,
wherein each lattice aperture extends circumferentially partway around the central axis and the plurality of lattice apertures are defined by a plurality of concentric rings and a plurality of radially extending spokes circumferentially offset from one another that extend between the plurality of rings to provide a tortuous path for heat to travel between the rotor assembly and the shaft while allowing thermal growth of the disk, and
wherein at least one of the rings has a radially-outer surface and the radially-outer surface is formed to include a radially inwardly extending depressed arcuate portion and one of the plurality of spokes is coupled to the at least one ring at the depressed arcuate portion and arranged to extend radially inwardly toward the central axis.

11. The wave rotor of claim 10, further comprising an inlet end plate and an outlet end plate spaced apart axially from the inlet end plate to locate the rotor assembly therebetween, the inlet end plate is formed to include an inlet port, and the outlet end plate is formed to include an outlet port.

12. A wave rotor comprising
a rotor assembly mounted for rotation about an axis, the rotor assembly including an inner band arranged around the axis, an outer band arranged circumferentially around the inner band, and a plurality of webs that extend radially between the inner band and the outer band to form a plurality of axially-extending combustion cells arranged circumferentially adjacent one another relative to the axis,
a shaft extending along the central axis and configured to rotate about the central axis, and
a disk coupled with the rotor assembly and the shaft and configured to transmit rotational energy from the shaft to the rotor assembly, the disk including a plurality of concentric rings and a plurality of radially extending spokes that extend between the plurality of rings, each spoke circumferentially offset from one another to define a plurality of concentric lattice apertures that extend axially through the disk and circumferentially partway around the central axis,
wherein the plurality of spokes includes a first set of spokes and a second set of spokes radially and circumferentially offset from the first set of spokes and each lattice aperture is defined circumferentially between directly neighboring spokes.

* * * * *